US012256117B2

(12) United States Patent
Wang et al.

(10) Patent No.: US 12,256,117 B2
(45) Date of Patent: Mar. 18, 2025

(54) VIDEO DEFINITION GRADE DETERMINING METHOD AND APPARATUS, SERVER, STORAGE MEDIUM AND SYSTEM

(71) Applicant: Beijing Zitiao Network Technology Co., Ltd., Beijing (CN)

(72) Inventors: Bin Wang, Beijing (CN); Xiaocheng Li, Beijing (CN); Bing Yan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/547,062

(22) PCT Filed: Mar. 3, 2022

(86) PCT No.: PCT/CN2022/079009
§ 371 (c)(1),
(2) Date: Aug. 18, 2023

(87) PCT Pub. No.: WO2022/199347
PCT Pub. Date: Sep. 29, 2022

(65) Prior Publication Data
US 2024/0137594 A1  Apr. 25, 2024
US 2024/0236395 A9  Jul. 11, 2024

(30) Foreign Application Priority Data

Mar. 24, 2021 (CN) .......................... 202110315814.4

(51) Int. Cl.
*H04N 21/2662* (2011.01)
*H04N 21/262* (2011.01)
*H04N 21/6379* (2011.01)

(52) U.S. Cl.
CPC ... *H04N 21/2662* (2013.01); *H04N 21/26216* (2013.01); *H04N 21/6379* (2013.01)

(58) Field of Classification Search
CPC ......... H04N 21/2662; H04N 21/26216; H04N 21/6379; H04N 21/23439; H04N 21/238;
(Continued)

(56) References Cited

U.S. PATENT DOCUMENTS

2014/0129825 A1  5/2014  Losev et al.
2015/0071075 A1  3/2015  Ramakrishnan
(Continued)

FOREIGN PATENT DOCUMENTS

CN    102904941 A    1/2013
CN    103458272 A    12/2013
(Continued)

OTHER PUBLICATIONS

Huang, S. et al., "State machine based video rate adaptation algorithm," Journal of Computer Applications, ISSN 1001-9081, Jul. 10, 2018, with English Abstract (6 pages).
(Continued)

*Primary Examiner* — Anthony Bantamoi

(57) ABSTRACT

The present disclosure provides a video definition grade determining method and apparatus, a server, a storage medium and a system. The video definition grade determining method comprises: in response to receiving a target video playing request transmitted by a client, determining a target region where the client is located and a current network speed of the client; determining, according to a video bit rate determining logic of the target region, a maximum video bit rate corresponding to the current network speed, wherein the video bit rate determining logic of the target region is used for determining a maximum video bit rate suitable for playing a video when a network speed of the target region is a respective network speed; obtaining a definition-grade video set for a target video corresponding to the target region; and according to the determined maximum
(Continued)

video bit rate and a video bit rate of a definition-grade video in the obtained definition-grade video set, determining, in the obtained definition-grade video set, a definition-grade video to be played corresponding to the target video playing request.

14 Claims, 4 Drawing Sheets

(58) Field of Classification Search
CPC ......... H04N 21/2402; H04N 21/44209; H04N 21/262
See application file for complete search history.

(56) References Cited

U.S. PATENT DOCUMENTS

2016/0142742 A1  5/2016  Qian et al.
2019/0261001 A1  8/2019  Holland et al.

FOREIGN PATENT DOCUMENTS

| | | |
|---|---|---|
| CN | 104010232 A | 8/2014 |
| CN | 105611321 A | 5/2016 |
| CN | 105611322 A | 5/2016 |
| CN | 105898408 A | 8/2016 |
| CN | 106688239 A | 5/2017 |
| CN | 111107395 A | 5/2020 |
| CN | 112019916 A | 12/2020 |

OTHER PUBLICATIONS

First Office Action issued Jul. 5, 2023 in Chinese Application No. 202110315814.4, with English translation (13 pages).
International Search Report issued May 24, 2022 in International Application No. PCT/CN2022/079009, with English translation (5 pages).
Written Opinion of International Searching Authority issued May 24, 2022 in International Application No. PCT/CN2022/079009, with English translation (10 pages).
International Preliminary Report on Patentability issued Sep. 12, 2023 in International Application No. PCT/CN2022/079009, with English translation (12 pages).

VIDEO DEFINITION GRADE DETERMINING METHOD AND APPARATUS, SERVER, STORAGE MEDIUM AND SYSTEM

CROSS-REFERENCE TO RELATED APPLICATIONS

The present application is a National Stage Entry of International application No. PCT/CN2022/079009 filed on Mar. 3, 2022, which claims priority to the Chinese Patent Application No. 202110315814.4 filed on Mar. 24, 2021, and entitled "VIDEO DEFINITION LEVEL GRADE DETERMINING METHOD AND APPARATUS, SERVER. STORAGE MEDIUM AND SYSTEM", the disclosure of which is incorporated by reference herein in its entirety.

TECHNICAL FIELD

Embodiments of the present disclosure relate to the technical field of video playback, and in particular, to a video definition grade determining method and apparatus, a server, a storage medium, a computer program, a computer program product, and a system.

BACKGROUND

With the rapid development of the Internet, network video applications are widely popularized and used, and bring great convenience to people's work and life. The network video applications include video applications, video websites, and various short video applications, etc.

SUMMARY

The embodiments of the disclosure provide a video definition grade determining method and apparatus, a server, a storage medium and a system.

In a first aspect, an embodiment of the present disclosure provides a video definition grade determining method, comprising:
  in response to receiving a target video playing request transmitted by a client, determining a target region where the client is located and a current network speed of the client;
  determining, according to a video bit rate determining logic of the target region, a maximum video bit rate corresponding to the current network speed, wherein the video bit rate determining logic of the target region is used for determining a maximum video bit rate suitable for playing a video when a network speed of the target region is a respective network speed;
  obtaining a definition-grade video set for a target video corresponding to the target region; and
  according to the determined maximum video bit rate and a video bit rate of a definition-grade video in the obtained definition-grade video set, determining, in the obtained definition-grade video set, a definition-grade video to be played corresponding to the target video playing request.

In some alternative implementations, the method further comprises: sending the definition-grade video to be played to the client.

In some alternative implementations, the according to the determined maximum video bit rate and the video bit rate of the definition-grade video in the obtained definition-grade video set, determining, in the obtained definition-grade video set, the definition-grade video to be played corresponding to the target video playing request, comprises:
  determining a definition-grade video with a video bit rate less than or equal to the determined maximum video bit rate in the obtained definition-grade video set as a candidate definition-grade video; and
  determining a candidate definition-grade video with a largest video bit rate among all of the candidate definition-grade videos as the definition-grade video to be played.

In some alternative implementations, the obtaining the definition-grade video set for the target video corresponding to the target region comprises:
  obtaining the definition-grade video set for the target video corresponding to the target region from a definition-grade video library.

In some alternative implementations, a definition-grade video set corresponding to each video, corresponding to the target region, stored in the definition-grade video library, includes definition-grade videos with N different definition-grade video bit rates, where N is a positive integer.

In some alternative implementations, the N different definition-grade video bit rates are determined by:
  acquiring network speed distribution of the target region, wherein the network speed distribution comprises M preset network speeds and corresponding network speed distribution proportions, where M is a positive integer;
  searching preset N' candidate video bit rates for different candidate video bit rate combinations, and determining an optimal candidate video bit rate combination in the different candidate video bit rate combinations, wherein among all of the different candidate video bit rate combinations, a comprehensive user experience quality index of the optimal candidate video bit rate combination in the target region is optimal, and
  determining the optimal candidate video bit rate combination as the N different definition-grade video bit rates.

In some alternative implementations, a comprehensive user experience quality index of the candidate video bit rate combination in the target region is determined according to at least one user experience quality index of the candidate video bit rate combination in the target region, wherein the user experience quality index comprises: average freeze rate, average freeze duration, average consumption bandwidth and average video quality value, and wherein a comprehensive user experience quality is negatively correlated with the average freeze rate, the average freeze duration and the average consumption bandwidth, and is positively correlated with the average video quality value.

In some alternative implementations, the average consumption bandwidth of the candidate video bit rate combination in the target region is obtained by:
  according to a minimum network speed determining logic of the target region, for each candidate video bit rate in the candidate video bit rate combination, determining a minimum network speed of the candidate video bit rate in the target region, wherein the minimum network speed determining logic of the target region is used for characterizing a correspondence between a respective video bit rate and a minimum network speed required for playing a video with the respective video bit rate in the target region;
  determining a network speed distribution interval of each candidate video bit rate in the candidate video bit rate combination in the target region, according to the network speed distribution of the target region and the minimum network speed of each candidate video bit rate in the candidate video bit rate combination in the target region; and weighting each candidate video bit rate in the candidate video bit rate combination, with a sum of network speed proportions of respective network speeds in the network speed distribution interval of the candidate video bit rate in the target region and summing, to obtain the average consumption bandwidth of the candidate video bit rate combination in the target region.

In some alternative implementations, the average freeze rate of the candidate video bit rate combination in the target region is obtained by:

for each candidate video bit rate in the candidate video bit rate combination, acquiring the network speed distribution interval of the candidate video bit rate in the target region, and weighting freeze rates of playing a video with the candidate video bit rate at different network speeds in the acquired network speed distribution interval in the target region, with network speed proportions corresponding to respective network speeds in the network speed distribution of the target region and summing, to obtain the average freeze rate of the candidate video bit rate in the target region; and determining a sum of the average freeze rate of each candidate video bit rate in the candidate video bit rate combination in the target region as the average freeze rate of the candidate video bit rate combination in the target region.

In some alternative implementations, the average freeze duration of the candidate video bit rate combination in the target region is obtained by:

for each candidate video bit rate in the candidate video bit rate combination, acquiring the network speed distribution interval of the candidate video bit rate in the target region, and weighting freeze durations of playing a video with the candidate video bit rate at different network speeds in the acquired network speed distribution interval in the target region, with network speed proportions corresponding to respective network speeds in the network speed distribution of the target region and summing, to obtain an average freeze duration of the candidate video bit rate in the target region; and determining a sum of the average freeze duration of each candidate video bit rate in the candidate video bit rate combination in the target region as the average freeze duration of the candidate video bit rate combination in the target region.

In some alternative implementations, the average video quality value of the candidate video bit rate combination in the target region is obtained by:

for each candidate video bit rate in the candidate video bit rate combination, determining a video quality value corresponding to the candidate video bit rate according to a preset video quality determining logic; and weighting the video quality value corresponding to each candidate video bit rate in the candidate video bit rate combination, with a sum of network speed proportions of respective network speeds in the network speed distribution interval of the corresponding candidate video bit rate in the target region and summing, to obtain the average video quality value of the candidate video bit rate combination in the target region.

In a second aspect, an embodiment of the present disclosure provides a video definition grade determining apparatus, comprising:

a region and network speed determining unit configured to, in response to receiving a target video playing request transmitted by a client, determine a target region where the client is located and a current network speed of the client;

a maximum bit rate determining unit configured to, determine, according to a video bit rate determining logic of the target region, a maximum video bit rate corresponding to the current network speed, wherein the video bit rate determining logic of the target region is used for determining a maximum video bit rate suitable for playing a video when a network speed of the target region is a respective network speed;

a definition-grade video obtaining unit configured to, obtain a definition-grade video set for a target video corresponding to the target region; and a to-be played video determining unit configured to, according to the determined maximum video bit rate and a video bit rate of a definition-grade video in the obtained definition-grade video set, determine, in the obtained definition-grade video set, a definition-grade video to be played corresponding to the target video playing request.

In some alternative implementations, the apparatus further comprises: a video sending unit configured to send the definition-grade video to be played to the client.

In some alternative implementations, the to-be-played video determining unit is further configured to:

determine a definition-grade video with a video bit rate less than or equal to the determined maximum video bit rate in the obtained definition-grade video set as a candidate definition-grade video; and determine a candidate definition-grade video with a largest video bit rate among all of the candidate definition-grade videos as the definition-grade video to be played.

In some alternative implementations, the definition-grade video obtaining unit is further configured to:

obtain the definition-grade video set for the target video corresponding to the target region from a definition-grade video library.

In some alternative implementations, a definition-grade video set corresponding to each video, corresponding to the target region, stored in the definition-grade video library, includes definition-grade videos with N different definition-grade video bit rates, where N is a positive integer.

In some alternative implementations, the N different definition-grade video bit rates are determined by:

acquiring network speed distribution of the target region, wherein the network speed distribution comprises M preset network speeds and corresponding network speed distribution proportions, where M is a positive integer;

searching preset N' candidate video bit rates for different candidate video bit rate combinations, and determining an optimal candidate video bit rate combination in the different candidate video bit rate combinations, wherein among all of the different candidate video bit rate combinations, a comprehensive user experience quality index of the optimal candidate video bit rate combination in the target region is optimal, and determining the optimal candidate video bit rate combination as the N different definition-grade video bit rates.

In some alternative implementations, the selecting, based on the network speed distribution of the target region, the N candidate video bit rates from preset N' candidate video bit rates as the N different definition-grade video bit rates comprises:
  searching the preset N' candidate video bit rates for different candidate video bit rate combinations, and determining an optimal candidate video bit rate combination in the different candidate video bit rate combinations, wherein a comprehensive user experience quality index of the optimal candidate video bit rate combination in the target region is optimal.

In some alternative implementations, a comprehensive user experience quality index of the candidate video bit rate combination in the target region is determined according to at least one user experience quality index of the candidate video bit rate combination in the target region, wherein the user experience quality index comprises: average freeze rate, average freeze duration, average consumption bandwidth and average video quality value, and wherein a comprehensive user experience quality is negatively correlated with the average freeze rate, the average freeze duration and the average consumption bandwidth, and is positively correlated with the average video quality value.

In some alternative implementations, the average consumption bandwidth of the candidate video bit rate combination in the target region is obtained by:
  according to a minimum network speed determining logic of the target region, for each candidate video bit rate in the candidate video bit rate combination, determining a minimum network speed of the candidate video bit rate in the target region, wherein the minimum network speed determining logic of the target region is used for characterizing a correspondence between a respective video bit rate and a minimum network speed required for playing a video with the respective video bit rate in the target region;
  determining a network speed distribution interval of each candidate video bit rate in the candidate video bit rate combination in the target region, according to the network speed distribution of the target region and the minimum network speed of each candidate video bit rate in the candidate video bit rate combination in the target region; and
  weighting each candidate video bit rate in the candidate video bit rate combination, with a sum of network speed proportions of respective network speeds in the network speed distribution interval of the candidate video bit rate in the target region and summing, to obtain the average consumption bandwidth of the candidate video bit rate combination in the target region.

In some alternative implementations, the average freeze rate of the candidate video bit rate combination in the target region is obtained by:
  for each candidate video bit rate in the candidate video bit rate combination, acquiring the network speed distribution interval of the candidate video bit rate in the target region, and weighting freeze rates of playing a video with the candidate video bit rate at different network speeds in the acquired network speed distribution interval in the target region, with network speed proportions corresponding to respective network speeds in the network speed distribution of the target region and summing, to obtain the average freeze rate of the candidate video bit rate in the target region; and
  determining a sum of the average freeze rate of each candidate video bit rate in the candidate video bit rate combination in the target region as the average freeze rate of the candidate video bit rate combination in the target region.

In some alternative implementations, the average freeze duration of the candidate video bit rate combination in the target region is obtained by:
  for each candidate video bit rate in the candidate video bit rate combination, acquiring the network speed distribution interval of the candidate video bit rate in the target region, and weighting freeze durations of playing a video with the candidate video bit rate at different network speeds in the acquired network speed distribution interval in the target region, with network speed proportions corresponding to respective network speeds in the network speed distribution of the target region and summing, to obtain an average freeze duration of the candidate video bit rate in the target region; and
  determining a sum of the average freeze duration of each candidate video bit rate in the candidate video bit rate combination in the target region as the average freeze duration of the candidate video bit rate combination in the target region.

In some alternative implementations, the average video quality value of the candidate video bit rate combination in the target region is obtained by:
  for each candidate video bit rate in the candidate video bit rate combination, determining a video quality value corresponding to the candidate video bit rate according to a preset video quality determining logic; and
  weighting the video quality value corresponding to each candidate video bit rate in the candidate video bit rate combination, with a sum of network speed proportions of respective network speeds in the network speed distribution interval of the corresponding candidate video bit rate in the target region and summing, to obtain the average video quality value of the candidate video bit rate combination in the target region.

In a third aspect, an embodiment of the present disclosure provides a video server, comprising: one or more processors; a storage device, on which one or more programs are stored, wherein the one or more programs, when executed by the one or more processors, cause the one or more processors to implement the method as described in any implementation of the first aspect.

In a fourth aspect, an embodiment of the present disclosure provides a non-transitory computer-readable storage medium on which a computer program is stored, wherein the computer program, when executed by one or more processors, implements the method as described in any implementation of the first aspect.

In a fifth aspect, an embodiment of the present disclosure provide a computer program comprising instructions which, when executed by a processor, implement the method as described in any implementation of the first aspect.

In a sixth aspect, an embodiment of the present disclosure provides a computer program product comprising instructions which, when executed by a processor, implement the method as described in any implementation of the first aspect.

BRIEF DESCRIPTION OF THE DRAWINGS

Other features, objects and advantages of the present disclosure will become more apparent upon reading the following detailed description of non-limiting embodiments thereof, with reference to the accompanying drawings. The drawings are only for purposes of illustrating specific embodiments and are not to be construed as limiting the present disclosure. In the drawings.

DETAILED DESCRIPTION

Figure 1:
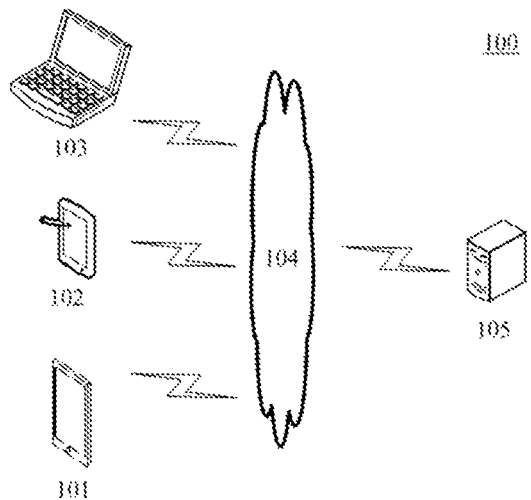
FIG. 1 is a diagram of exemplary system architecture to which some embodiments of the present disclosure may be applied.

The present disclosure is described in further detail below in conjunction with the drawings and the embodiments. It is to be understood that the specific embodiments described herein are merely used for interpreting related applications rather than limiting the application. It should also be noted that, for convenience of description, only portions related to the related applications are shown in the drawings.

It should be noted that, the embodiments in the present disclosure and the features in the embodiments may be combined with each other without conflict. The present disclosure will be illustrated in detail below with reference to the accompanying drawings in conjunction with the embodiments.

In order to balance picture quality and video smoothness of a video watched by a user, each network video application, in a process of the user watching the video, is often matched with a corresponding video definition grade in conjunction with an actual network condition of the user. However, at present, in most cases, for users in all different regions, dividing is performed only according to video bit rate or video frame image resolution, which is coarse in granularity, without considering differences in network speeds of different regions, so that the network speed of each region cannot be well adapted to.

In order to differentially perform video definition grade matching for different regions, the video definition grade determining method and apparatus, server, storage medium, computer program, computer program product and system provided by the embodiments of the disclosure differentially treat video playing requests transmitted by clients from different regions, firstly determine a target region where a client is located, and determine a current network speed of the client; then determine, according to a video bit rate determining logic of the target region, a maximum video bit rate corresponding to the current network speed, wherein the video bit rate determining logic of the target region is used for determining a maximum video bit rate suitable for playing a video when a network speed of the target region is a respective network speed; thereafter, obtain a definition-grade video set for a target video corresponding to the target region; and finally, according to the determined maximum video bit rate and a video bit rate of a definition-grade video in the obtained definition-grade video set, determine, in the definition-grade video set corresponding to the target video, a definition-grade video to be played corresponding to the target video playing request. That is, for video playing requests from clients in different regions, determine differentially and in customized manner, according to the video bit rate determining logic of the region where the client is located, a corresponding maximum video bit rate according to an actual network speed of the client, store, for different regions, different definition-grade video sets suitable for the corresponding regions for the same video, and determine, in the definition-grade video set of the region, a definition-grade video to be played according to the determined maximum video bit rate, so that the network speeds of the different regions can be better adapted to, and both image quality and video smoothness can be considered to a greater extent.

FIG. 1 illustrates an exemplary system architecture 100 to which embodiments of the video definition grade determining method or video definition grade determining apparatus of the present disclosure may be applied.

As shown in FIG. 1, the system architecture 100 may comprise clients 101, 102, 103, a network 104, and a video server 105. The network 104 serves as a medium for providing communication links between the clients 101, 102, 103 and the video server 105. The network 104 may include various connection types, such as wired, wireless communication links, or fiber optic cables, among others.

A user may use the clients 101, 102, 103 to interact with the video server 105 over the network 104 to receive or transmit messages, etc. Various communication client applications, such as an audio and video conference application, an online game application, a voice recognition application, a web browser application, a shopping application, a search application, an instant messaging tool, a mailbox client, social platform software, and the like, may be installed on the clients 101, 102, and 103.

The clients 101, 102, 103 may be hardware or software. When the clients 101, 102, 103 are hardware, they may be various electronic devices having a display screen and supporting video playback, including but not limited to smart phones, tablet computers, e-book readers, MP3 (Moving Picture Experts Group Audio Layer III) players, MP4 (Moving Picture Experts Group Audio Layer IV) players, laptop portable computers, desktop computers, and the like. When the clients 101, 102, 103 are software, they can be installed in the electronic devices listed above. The clients may be implemented as a plurality of software or software modules (for example, for providing a video playback service), or may be implemented as a single software or software module. It is not particularly limited herein.

The video server 105 may be a server that provides various services, such as analyzing and processing video playing requests issued by the clients 101, 102, 103, and feeding back video data to the clients 101, 102, 103, and the like.

It should be noted that, the video server 105 may be hardware or software. When the video server 105 is hardware, it may be implemented as a distributed server cluster composed of a plurality of servers, or may be implemented as a single server. When the video server 105 is software, it may be implemented as a plurality of software or software modules, or may be implemented as a single software or software module. It is not particularly limited herein.

It should be noted that the video definition grade determining method provided by the present disclosure is generally executed by the video server 105, and accordingly, the video definition grade determining apparatus is generally disposed in the video server 105.

It should be understood that the number of clients, networks, and video servers in FIG. 1 is merely illustrative. There may be any number of clients, networks, and video servers as desired for an implementation.

Figure 2:
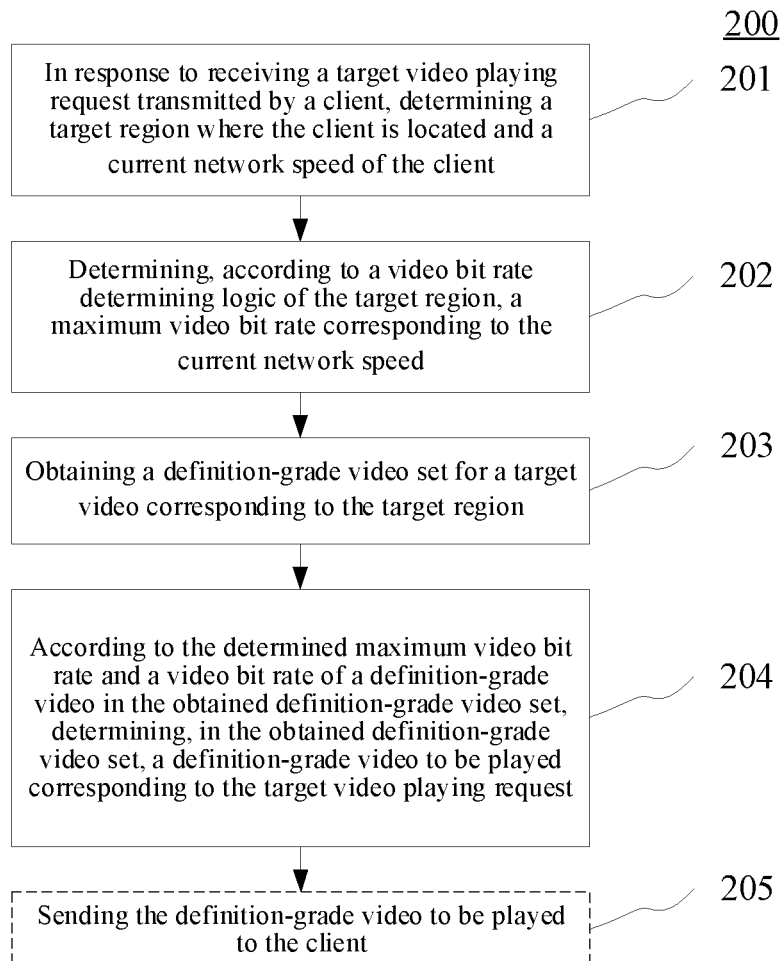
FIG. 2 is a flow diagram of some embodiments of a video definition grade determining method according to the present disclosure.

With continued reference to FIG. 2, a process 200 of an embodiment of a video definition grade determining method according to the present disclosure is shown. The process 200 may comprise the following steps:

step 201, in response to receiving a target video playing request transmitted by a client, determining a target region where the client is located and a current network speed of the client.

In this embodiment, an execution subject (for example, the video server 105 shown in FIG. 1) of the video definition grade determining method may determine, in a case where a playing request for a target video transmitted by the client is received, a region where the client is located as the target region, and determine the current network speed of the client.

Here, the region where the client is located may adopt various preset geographic or administrative area divisions, which are not specifically limited in this disclosure. For example, the area division may be performed in units of administrative area division of province, autonomous region, and municipality directly under the central government.

Step 202, determining, according to a video bit rate determining logic of the target region, a maximum video bit rate corresponding to the current network speed.

Here, the execution subject may obtain the video bit rate determining logic of the target region after determining the target region where the client is located. For example, the execution subject may locally store the video bit rate determining logic of different regions in advance. The video bit rate determining logic of the target region is used for determining a maximum video bit rate suitable for playing a video when a network speed of the target region is a respective network speed. Here, it can also be understood that, when the network speed of the target region is the respective network speed, if the video bit rate of the played video is less than or equal to the corresponding maximum video bit rate, the video smoothness and image quality of the played video can be accepted by the user; on the contrary, when the network speed of the target region is the respective network speed, if the video bit rate of the played video is greater than the corresponding maximum video bit rate, the video smoothness and image quality of the played video are difficult to be accepted by the user.

As an example, the video bit rate determining logic of the target region may be a correspondence table or calculation formula, which is formulated by technicians after performing statistical analysis according to historical network speed distribution of the target region, video bit rates of videos historically played in the target region, and corresponding freeze rates, freeze durations and other data, and stored in the execution subject, wherein the correspondence table is used for looking up the corresponding maximum video bit rate according to the network speed, and the calculation formula is used for performing calculation on the network speed to obtain the maximum video bit rate.

Then, the execution subject may determine the maximum video bit rate corresponding to the current network speed according to the video bit rate determining logic of the target region.

For example, when the video bit rate determining logic of the target region is the correspondence table, the maximum video bit rate corresponding to the current network speed may be looked up in the correspondence table.

When the video bit rate determining logic of the target region is the calculation formula, calculation on the current network speed can be performed according to the calculation formula, and the calculation result is determined as the maximum video bit rate.

In some alternative implementations, the video bit rate determining logic of the target region may be a video bit rate determining quadratic root. Correspondingly, the determining, according to the video bit rate determining logic of the target region, the maximum video bit rate corresponding to the current network speed, is to solve the video bit rate determining quadratic root for the current network speed, and determine the calculation result as the maximum video bit rate. Alternatively, the following formula can be used:

$$\text{Internet\_speed} = a_1 * \text{max\_bitrate}^2 + b_1 * \text{max\_bitrate} + c_1 \quad \text{(Formula 1)}$$

where internet_speed is the current network speed, max_bitrate is the maximum video bit rate, and $a_1$, $b_1$, and $c_1$ are constants.

Step 203, obtaining a definition-grade video set for a target video corresponding to the target region.

In this embodiment, for different regions, the definition-grade video sets corresponding to the regions may be stored for the target video, in the execution subject locally or in another electronic device connected to the execution subject through a network. Each video content in the definition-grade video sets for different regions for the target video is the same as video content of the target video. Video bit rates of different videos in the same definition-grade video set are different.

Then, the execution subject may locally or remotely obtain the definition-grade video set for the target video corresponding to the target region.

Step 204, according to the determined maximum video bit rate and a video bit rate of a definition-grade video in the obtained definition-grade video set, determining, in the obtained definition-grade video set, a definition-grade video to be played corresponding to the target video playing request.

In this embodiment, the execution subject may adopt various implementations, to determine, according to the determined maximum video bit rate and the video bit rate of the definition-grade video in the obtained definition-grade video set, in the obtained definition-grade video set, the definition-grade video to be played corresponding to the target video playing request.

In some alternative implementations, the step 204 may be performed as follows:

firstly, determining a definition-grade video with a video bit rate less than or equal to the determined maximum video bit rate in the obtained definition-grade video set as a candidate definition-grade video; and then determining a candidate definition-grade video with a largest video bit rate among all of the candidate definition-grade videos as the definition-grade video to be played.

That is, the definition-grade video to be played determined according to the alternative implementations is closest to the maximum video bit rate corresponding to the current network speed of the client, and can provide best video picture quality for the user.

Alternatively, a candidate definition-grade video with a video bit rate at the median among all of the candidate definition-grade videos can be determined as the definition-grade video to be played, so that both video smoothness and video picture quality can be better considered.

Alternatively, when the video bit rate of each definition-grade video in the obtained definition-grade video set is greater than the determined maximum video bit rate, a definition-grade video with a minimum video bit rate among them can be selected and determined as the definition-grade video to be played. Namely, a definition-grade video with a bit rate as low as possible is selected, to ensure video smoothness as much as possible and reduce freeze.

In some alternative implementations, the process 200 may further comprise the following step 205:

step 205, sending the definition-grade video to be played to the client.

In this embodiment, the execution subject may send the definition-grade video to be played, which is determined in the step 204, to the client. Further, the client can play the received definition-grade video to be played, and the video bit rate of the played definition-grade video is adaptive to the network speed of the region where the client is located, so that the user experience is improved.

The video definition grade determining method provided by the above embodiments of the disclosure, by differentially treating video playing requests transmitted by clients from different regions, determines, according to a video bit rate determining logic of the target region where the client is located, a maximum video bit rate corresponding to the current network speed of the client; thereafter, obtain a definition-grade video set for the target video corresponding to the target region; and finally, according to the determined maximum video bit rate and a video bit rate of a definition-grade video in the obtained definition-grade video set, determine, in the definition-grade video set corresponding to the target video, a definition-grade video to be played corresponding to the target video playing request. Thus, network speeds of different regions can be adapted to, and both image quality and video smoothness can be considered to a greater extent.

In some alternative implementations, the step 203 of obtaining the definition-grade video set for the target video corresponding to the target region may be obtaining the definition-grade video set for the target video corresponding to the target region from a definition-grade video library. It can also be understood that in the definition-grade video library, definition-grade video sets for each of a plurality of videos in different regions are stored. The video bit rate combinations corresponding to videos in the definition-grade video sets for different videos in the same region are the same, and accordingly, a definition-grade video set corresponding to each video, corresponding to the target region, stored in the definition-grade video library can comprise definition-grade videos with N different definition-grade video bit rates, where N is a positive integer.

Here, the N different definition-grade video bit rates for the target region may be a combination of N different definition-grade video bit rates, which are formulated by technicians after performing statistical analysis according to historical network speed distribution of the target region, video bit rates of videos historically played in the target region, and corresponding freeze rates, freeze durations and other data, and stored in the execution subject.

For example, assuming that there are 3 videos U, V and W and 2 regions D1 and D2, the definition-grade video sets for each of the videos U, V and W in the region D1 may be definition-grade video sets U1, V1 and W1, respectively. The definition-grade video set U1 includes 4 videos U11, U12, U13 and U14, video contents of the videos U11, U12, U13 and U14 are all video U, and video bit rates of the videos U11, U12, U13 and U14 are BR11, BR12, BR13 and BR14, respectively. The definition-grade video set V1 also includes 4 videos V11, V12, V13 and V14, video contents of the videos V11, V12, V13 and V14 are all video V, and video bit rates of the videos V11, V12, V13 and V14 are also BR11, BR12, BR13 and BR14, respectively. The definition-grade video set W1 also includes 4 videos W11, W12, W13 and W14, video contents of the videos W11, W12, W13 and W14 are all video W, and video bit rates of the videos W11, W12, W13 and W14 are also BR11, BR12, BR13 and BR14, respectively. That is, for different videos U, V and W, the number of definition-grade videos in definition-grade video sets U1, V1 and W1 of the same region D1 is the same, namely all 4 videos, and the 4 definition-grade videos correspond to a fixed video bit rate combination: BR11, BR12, BR13, and BR14. Similarly, the region D2 is not described in detail, for example, for different videos U, V and W, the number of definition-grade videos in definition-grade video sets U2, V2 and W2 of the same region D2 is the same, for example, all 5 videos, and the 5 definition-grade videos may correspond to a fixed video bit rate combination: BR21, BR22, BR23, BR24 and BR25.

Figure 3:
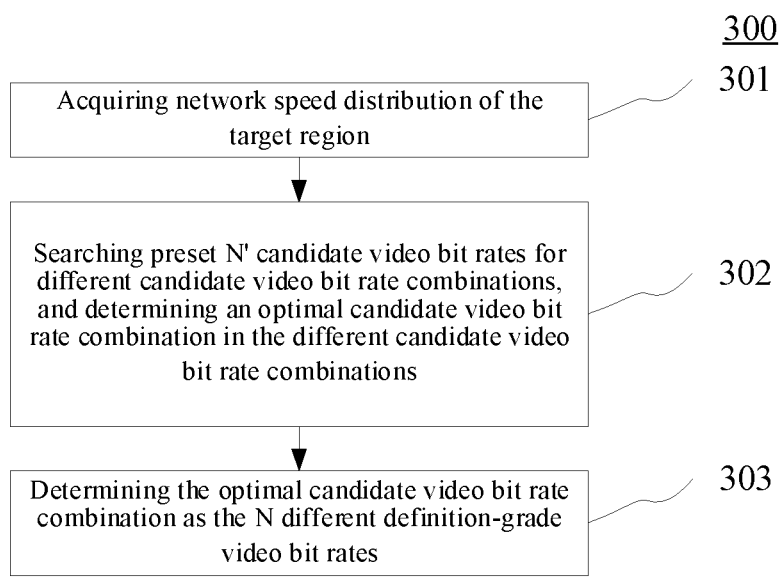
FIG. 3 is a flow diagram of some embodiments of a method of determining N different definition-grade video bit rates according to the present disclosure.

Alternatively, the N different definition-grade video bit rates are determined by a process 300 shown in FIG. 3:

Step 301, acquiring network speed distribution of the target region.

Here, the network speed distribution of the target region may include M preset network speeds and corresponding distribution proportions of the network speeds in the target region, where M is a positive integer.

Step 302, searching preset N' candidate video bit rates for different candidate video bit rate combinations, and determining an optimal candidate video bit rate combination in the different candidate video bit rate combinations.

Here, among all of the different candidate video bit rate combinations, a comprehensive user experience quality index of the optimal candidate video bit rate combination in the target region is optimal.

Here, when the preset N' candidate video bit rates are searched for the different candidate video bit rate combinations, a comprehensive search, or various search optimization algorithms (for example, pre-pruning according to a preset pruning rule, etc.) may be adopted, which is not specifically limited by the present disclosure.

A comprehensive user experience quality index of the candidate video bit rate combination in the target region may be determined according to at least one user experience quality index of the candidate video bit rate combination in the target region. Here, the user experience quality index may include but is not limited to: average freeze rate, average freeze duration, average consumption bandwidth and average video quality value. The comprehensive user experience quality index is negatively correlated with the average freeze rate, the average freeze duration and the average consumption bandwidth, and is positively correlated with the average video quality value. The positive correlation may be linearly positive correlation or nonlinearly positive correlation, and the negative correlation may be linearly negative correlation or nonlinearly negative correlation, which is not specifically limited in this disclosure.

Figure 4:
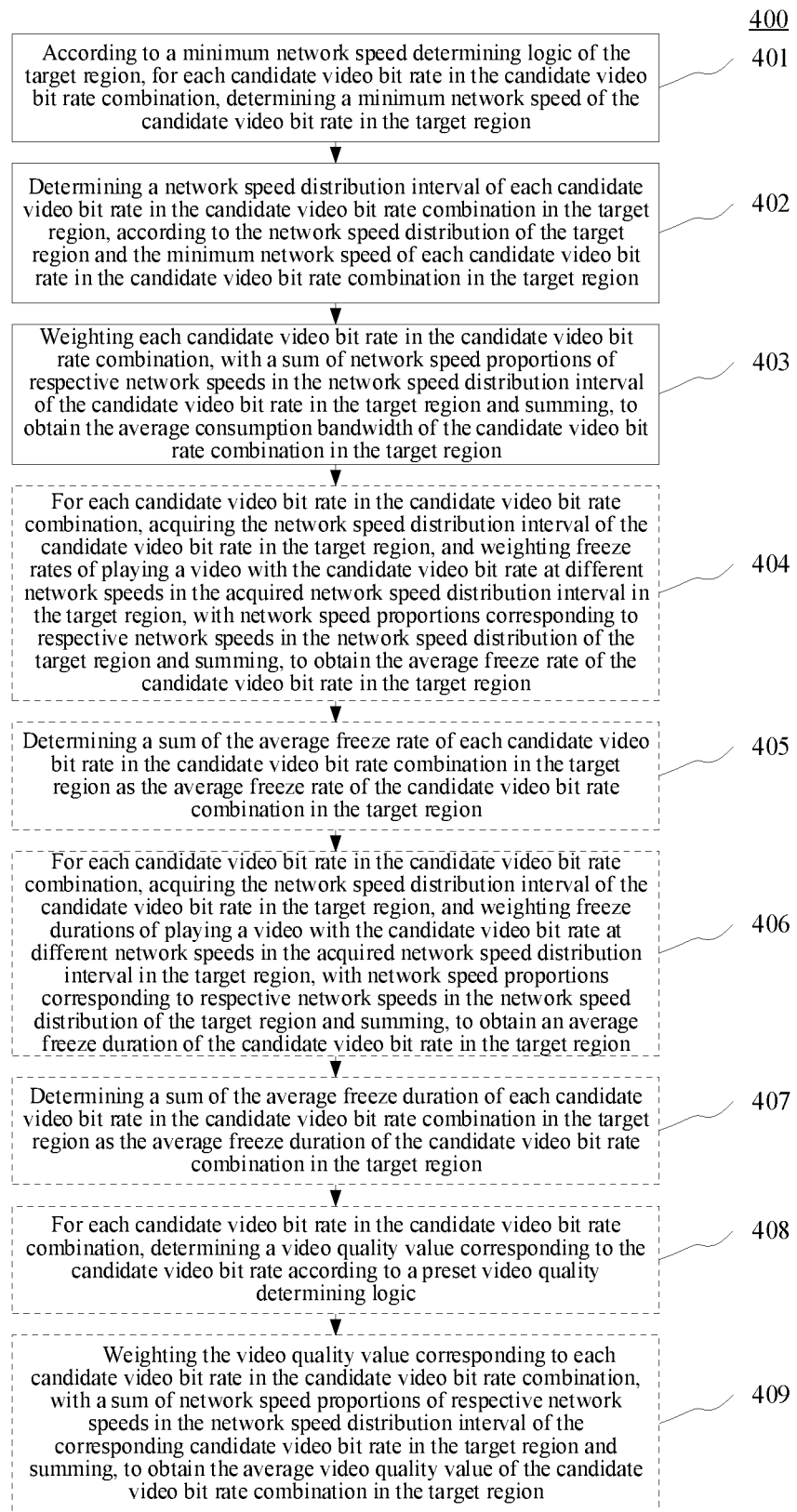
FIG. 4 is a flow diagram of some embodiments of a method of determining average consumption bandwidth, average freeze rate, average freeze duration and average video quality value of a candidate video bit rate combination in a target region, according to the present disclosure.

Alternatively, the average consumption bandwidth of the candidate video bit rate combination in the target region may be calculated by a process 400 shown in FIG. 4, where the process 400 comprises the following steps 401 to 403:

Step 401, according to a minimum network speed determining logic of the target region, for each candidate video bit rate in the candidate video bit rate combination, determining a minimum network speed of the candidate video bit rate in the target region.

Here, the minimum network speed determining logic of the target region is used for characterizing a correspondence between a respective video bit rate and a minimum network speed required for playing a video with the respective video bit rate in the target region. Here, it can also be understood that, when a video with the respective video bit rate is played in the target region, if the network speed of the client in the target region is greater than or equal to the corresponding minimum network speed, both video smoothness and image quality of the played video can be accepted by the user; on the contrary, when the video with the respective video bit rate is played in the target region, if the network speed of the client in the target region is lower than the corresponding minimum network speed, both video smoothness and image quality of the played video are difficult to be accepted by the user.

As an example, the minimum network speed determining logic of the target region may be a correspondence table or calculation formula, which is formulated by technicians after performing statistical analysis according to historical network speed distribution of the target region, video bit rates of videos historically played in the target region, and corresponding freeze rates, freeze durations and other data, and stored in the execution subject, wherein the correspondence table is used for looking up the corresponding minimum network speed according to the video bit rate, and the calculation formula is used for performing calculation on the video bit rate to obtain the minimum network speed.

For example, when the minimum network speed determining logic of the target region is the correspondence table, the minimum network speed corresponding to the candidate video bit rate may be looked up in the correspondence table.

When the minimum network speed determining logic of the target region is the calculation formula, calculation on the candidate video bit rate can be performed according to the calculation formula, and the calculation result is determined as the minimum network speed.

In some alternative implementations, the minimum network speed determining logic of the target region may be a minimum network speed determine quadratic equation. Correspondingly, the determining, according to the minimum network speed determining logic of the target region, the minimum network speed corresponding to the candidate video bit rate is to solve the minimum network speed determine quadratic equation for the candidate video bit rate, and determine the calculation result as the minimum network speed. Alternatively, the following formula can be used:

$$\text{min\_speed}=a2*\text{candi\_bitrate}\wedge 2+b2*\text{candi\_bitrate}+c2 \quad \text{(Formula 2)}$$

where min_speed is the solved minimum network speed, candi_bitrate is the candidate video bit rate, and a2, b2 and c2 are constants.

For example, the candidate video bit rate combination comprises three candidate video bit rates B1, B2 and B3 which are ranked in an ascending order, and the minimum network speeds of B1, B2 and B3 in the target region are S1, S2 and S3 respectively.

Step 402, determining a network speed distribution interval of each candidate video bit rate in the candidate video bit rate combination in the target region, according to the network speed distribution of the target region and the minimum network speed of each candidate video bit rate in the candidate video bit rate combination in the target region.

Continuing with the above example, wherein the minimum network speeds of the three candidate video bit rates B1, B2 and B3 which are ranked in an ascending order, in the candidate video bit rate combination in the target region, are S1, S2 and S3, respectively, assuming that a network speed distribution interval of the target region is 0 to Max S, the network speed distribution of the target region may be divided into four zones, which are: 0 to S1, S1 to S2, S2 to S3, and S3 to Max S. The network speed in the zone 0 to S1 does not meet the requirement for playing a video with any bit rate among B1, B2 and B3, but in order to ensure that the client can still play the video when the network speed of the target region is between 0 and S1, the two zones 0 to S1 and S1 to S2 are both determined as the network speed distribution interval of B1 in the target region. Moreover, S2 to S3 is the network speed distribution interval of B2 in the target region, and S3 to Max S is the network speed distribution interval of B3 in the target region.

Step 403, weighting each candidate video bit rate in the candidate video bit rate combination, with a sum of network speed proportions of respective network speeds in the network speed distribution interval of the candidate video bit rate in the target region and summing, to obtain the average consumption bandwidth of the candidate video bit rate combination in the target region.

Continuing with the above example, the average consumption bandwidth of the candidate video bit rate combination in the target region can be calculated as follows:

$$\text{Band-Avg}=B1*P1+B2*P2+B3*P3 \quad \text{(Formula 3)}$$

where Band-Avg is the calculated average consumption bandwidth of the candidate video bit rate combination in the target region, P1 is a sum of network speed proportions corresponding to network speeds whose corresponding network speed values are between 0 and S2 in the network speed distribution of the target region, P2 is a sum of network speed proportions corresponding to network speeds whose corresponding network speed values are between S2 and S3 in the network speed distribution of the target region, and P3 is a sum of network speed proportions corresponding to network speeds whose corresponding network speed values are between S3 and Max S in the network speed distribution of the target region.

Alternatively, the average freeze rate of the candidate video bit rate combination in the target region may be obtained by performing the following steps 404 and 405 on the basis of the above steps 401 and 402:

Step 404, for each candidate video bit rate in the candidate video bit rate combination, acquiring the network speed distribution interval of the candidate video bit rate in the target region, and weighting freeze rates of playing a video with the candidate video bit rate at different network speeds in the acquired network speed distribution interval in the target region, with network speed proportions corresponding to respective network speeds in the network speed distribution of the target region and summing, to obtain the average freeze rate of the candidate video bit rate in the target region.

Continuing with the candidate video bit rate B1 in the above example, the average freeze rate of the candidate video bit rate B1 in the target region can be calculated as follows:

Firstly, statistical analysis can be performed on freeze rate data of playing a video with a bit rate of the candidate video bit rate at clients with different network speeds in the target region in history, and the freeze rates of playing the video with a bit rate of the candidate video bit rate B1 at different network speeds in the target region are obtained.

Then, the network speed distribution interval of the candidate video bit rate B1 in the target region may be obtained, which is 0 to S2.

And then, the freeze rates of playing the video with the candidate video bit rate B1 at different network speeds in the network speed distribution interval 0 to S2 in the target region are weighted with network speed proportions corresponding to respective network speeds in the network speed distribution of the target region and summed, to obtain the average freeze rate of the candidate video bit rate B1 in the target region.

For example, the target region includes 5 different network speed values within the network speed distribution interval 0 to S2: netspeed1, netspeed2, netspeed3, netspeed4, and netspeed5, freeze rates of playing a video with the candidate video bit rate B1 at the 5 different network speeds netspeed1, netspeed2, netspeed3, netspeed4, and netspeed5 in the network speed distribution interval 0 to S2 in the target region are caton1, caton2, caton3, caton4, and caton5, respectively, and corresponding network speed proportions of the 5 different network speed values in the target region are netrate1, netrate2, netrate3, netrate4, and netrate5, respectively, so the average freeze rate of the candidate video bit rate B1 in the target region can be calculated as follows:

$$Caton\_Avg\_B1 = caton1*netrate1 + caton2*netrate2 + caton3*netrate3 + caton4*netrate4 + caton5*netrate5 \quad \text{(Formula 4)}$$

where Caton_Avg_B1 is the calculated average freeze rate of the candidate video bit rate B1 in the target region.

Step 405, determining a sum of the average freeze rate of each candidate video bit rate in the candidate video bit rate combination in the target region as the average freeze rate of the candidate video bit rate combination in the target region.

Alternatively, the average freeze duration of the candidate video bit rate combination in the target region can be obtained by performing the following steps 406 and 407 on the basis of the above steps 401 and 402:

step 406, for each candidate video bit rate in the candidate video bit rate combination, acquiring the network speed distribution interval of the candidate video bit rate in the target region, and weighting freeze durations of playing a video with the candidate video bit rate at different network speeds in the acquired network speed distribution interval in the target region, with network speed proportions corresponding to respective network speeds in the network speed distribution of the target region and summing, to obtain an average freeze duration of the candidate video bit rate in the target region Continuing with the candidate video bit rate B1 in the above example, the average freeze duration of the candidate video bit rate B1 in the target region can be calculated as follows:

Firstly, statistical analysis can be performed on freeze duration data of playing a video with a bit rate of the candidate video bit rate at clients with different network speeds in the target region in history, and the freeze durations of playing the video with a bit rate of the candidate video bit rate B1 at different network speeds in the target region are obtained.

Then, the network speed distribution interval of the candidate video bit rate B1 in the target region may be acquired, which is 0 to S2.

And then, the freeze durations of playing the video with the candidate video bit rate B1 at different network speeds in the network speed distribution interval 0 to S2 in the target region are weighted with network speed proportions corresponding to respective network speeds in the network speed distribution of the target region and summed, to obtain the average freeze duration of the candidate video bit rate B1 in the target region.

For example, the target region includes 5 different network speed values within the network speed distribution interval 0 to S2: netspeed1, netspeed2, netspeed3, netspeed4 and netspeed5, freeze durations of playing a video with the candidate video bit rate B1 at the 5 different network speeds, netspeed1, netspeed2, netspeed3, netspeed4 and netspeed5 in the network speed distribution interval 0 to S2 in the target region are t1, t2, t3, t4 and t5 respectively, and corresponding network speed proportions of the 5 different network speed values in the target region are netrate1, netrate2, netrate3, netrate4 and netrate5 respectively, so the average freeze duration of the candidate video bit rate B1 in the target region can be calculated as follows:

$$T\_Avg\_B1 = t1*netrate1 + t2*netrate2 + t3*netrate3 + t4*netrate4 + t5*netrate5 \quad \text{(Formula 5)}$$

where T_Avg_B1 is the calculated average freeze duration of the candidate video bit rate B1 in the target region.

Step 407, determining a sum of the average freeze durations of each candidate video bit rate in the candidate video bit rate combination in the target region as the average freeze duration of the candidate video bit rate combination in the target region.

Alternatively, a comprehensive video quality value of the candidate video bit rate combination in the target region may be obtained by performing the following steps 408 and 409 on the basis of the above steps 401 and 402:

step 408, for each candidate video bit rate in the candidate video bit rate combination, determining a video quality value corresponding to the candidate video bit rate according to a preset video quality determining logic.

Here, the video quality determining logic is used for characterizing a correspondence between the video bit rate and the video quality value. For example, the video quality determining logic may be calculated using a VMAF (Video Multi-Method Assessment Fusion) video quality assessment tool (which is a video quality comparison analysis tool introduced by Netflix). The video quality determining logic may also be to calculate PSNR (Peak Signal to Noise Ratio) and the like.

Step 409, weighting the video quality value corresponding to each candidate video bit rate in the candidate video bit rate combination, with a sum of network speed proportions of respective network speeds in the network speed distribution interval of the corresponding candidate video bit rate in the target region and summing, to obtain the average video quality value of the candidate video bit rate combination in the target region.

Continuing with the above example, the average video quality value of the candidate video bit rate combination in the target region may be calculated as follows:

$$Quality\_Avg = Q\_B1*P1 + Q\_B2*P2 + Q\_B3*P3 \quad \text{(Formula 6)}$$

where Quality_Avg is the calculated average video quality value of the candidate video bit rate combination in the target region, Q_B1, Q_B2 and Q_B3 are video quality values corresponding to the candidate video bit rates B1, B2 and B3 respectively, P1 is a sum of network speed proportions corresponding to network speeds whose corresponding network speed values are from 0 to S2 in the network speed distribution of the target region, P2 is a sum of network speed proportions corresponding to network speeds whose corresponding network speed values are from S2 to S3 in the network speed distribution of the target region, and P3 is a sum of network speed proportions corresponding to network speeds whose corresponding network speed values are from S3 to Max S in the network speed distribution of the target region.

The optimal candidate video bit rate combination can be obtained through the step 302.

Step 303, determining the optimal candidate video bit rate combination as N different definition-grade video bit rates.

The N different definition-grade video bit rates obtained according to the process 300 are an optimal candidate video bit rate combination designed for the network speed distribution of the target region, so that when the definition-grade video set for the target video is stored, for each region, definition-grade videos adapted to the network speed distribution of the region are separately stored, thus both user experience (for example, including video smoothness and video image quality) and bandwidth cost provided by the video service can be considered.

Figure 5:
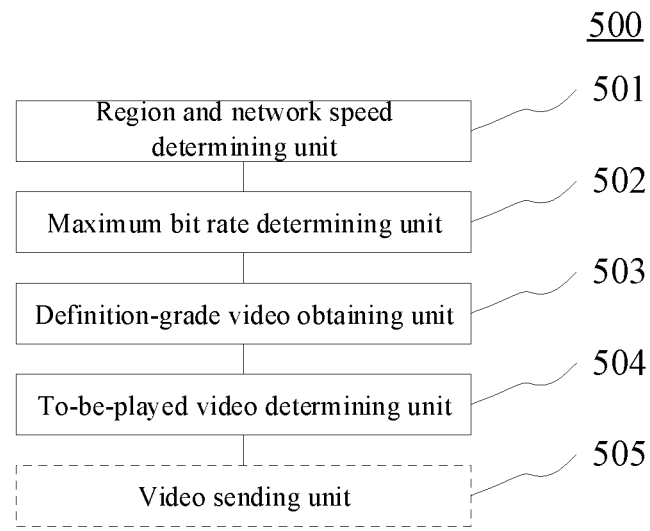
FIG. 5 is a schematic block diagram of some embodiments of a video definition grade determining apparatus according to the present disclosure.

With further reference to FIG. 5, as an implementation of the methods shown in the above drawings, the present disclosure provides an embodiment of a video definition grade determining apparatus, which corresponds to the method embodiment shown in FIG. 2, and the apparatus is specifically applicable to various video servers.

As shown in FIG. 5, the video definition grade determining apparatus 500 of the present embodiment comprises: a region and network speed determining unit 501, a maximum bit rate determining unit 502, a definition-grade video obtaining unit 503, and a to-be-played video determining unit 504. The region and network speed determining unit 501 is configured to, in response to receiving a target video playing request transmitted by a client, determine a target region where the client is located and a current network speed of the client; the maximum bit rate determining unit 502 is configured to, determine, according to a video bit rate determining logic of the target region, a maximum video bit rate corresponding to the current network speed, wherein the video bit rate determining logic of the target region determines a maximum video bit rate suitable for playing a video when a network speed of the target region is a respective network speed; the definition-grade video obtaining unit 503 is configured to, obtain a definition-grade video set for the target video corresponding to the target region; and the to-be-played video determining unit 504 is configured to, according to the determined maximum video bit rate and a video bit rate of a definition-grade video in the obtained definition-grade video set, determine, in the obtained definition-grade video set, a definition-grade video to be played corresponding to the target video playing request.

In this embodiment, specific processes of the region and network speed determining unit 501, the maximum bit rate determining unit 502, the definition-grade video obtaining unit 503, and the to-be-played video determining unit 504 of the video definition grade determining apparatus 500 and technical effects thereof may respectively refer to relevant descriptions of the step 201, step 202, step 203, and step 204 in the corresponding embodiment in FIG. 2, and are not repeated here.

In some alternative implementations, the apparatus 500 may further comprise: a video sending unit 505 configured to send the definition-grade video to be played to the client.

In some alternative implementations, the to-be-played video determining unit 504 may be further configured to:
determine a definition-grade video with a video bit rate less than or equal to the determined maximum video bit rate in the obtained definition-grade video set as a candidate definition-grade video; and
determine a candidate definition-grade video with a largest video bit rate among all of the candidate definition-grade videos as the definition-grade video to be played.

In some alternative implementations, the definition-grade video obtaining unit 503 may be further configured to:
obtain the definition-grade video set for the target video corresponding to the target region from a definition-grade video library.

In some alternative implementations, a definition-grade video set corresponding to each video, corresponding to the target region, stored in the definition-grade video library, may include definition-grade videos with N different definition-grade video bit rates, where N is a positive integer.

In some alternative implementations, the N different definition-grade video bit rates may be determined by:
acquiring network speed distribution of the target region, wherein the network speed distribution comprises M preset network speeds and corresponding network speed distribution proportions, where M is a positive integer;
searching preset N' candidate video bit rates for different candidate video bit rate combinations, and determining an optimal candidate video bit rate combination in the different candidate video bit rate combinations, wherein among all of the different candidate video bit rate combinations, a comprehensive user experience quality index of the optimal candidate video bit rate combination in the target region is optimal, and
determining the optimal candidate video bit rate combination as the N different definition-grade video bit rates.

In some alternative implementations, a comprehensive user experience quality index of the candidate video bit rate combination in the target region may be determined according to at least one user experience quality index of the candidate video bit rate combination in the target region, wherein the user experience quality index comprises: average freeze rate, average freeze duration, average consumption bandwidth, average video quality value, and wherein a comprehensive user experience quality is negatively correlated with the average freeze rate, the average freeze duration and the average consumption bandwidth, and is positively correlated with the average video quality value.

In some alternative implementations, the average consumption bandwidth of the candidate video bit rate combination in the target region may be obtained by:
according to a minimum network speed determining logic of the target region, for each candidate video bit rate in the candidate video bit rate combination, determining a minimum network speed of the candidate video bit rate in the target region, wherein the minimum network speed determining logic of the target region is used for characterizing a correspondence between a respective video bit rate and a minimum network speed required for playing a video with the respective video bit rate in the target region;
determining a network speed distribution interval of each candidate video bit rate in the candidate video bit rate combination in the target region, according to the network speed distribution of the target region and the minimum network speed of each candidate video bit rate in the candidate video bit rate combination in the target region; and weighting each candidate video bit rate in the candidate video bit rate combination, with a sum of network speed proportions of respective network speeds in the network speed distribution interval of the candidate video bit rate in the target region and summing, to obtain the average consumption bandwidth of the candidate video bit rate combination in the target region.

In some alternative implementations, the average freeze rate of the candidate video bit rate combination in the target region may be obtained by:

for each candidate video bit rate in the candidate video bit rate combination, acquiring the network speed distribution interval of the candidate video bit rate in the target region, and weighting freeze rates of playing a video with the candidate video bit rate at different network speeds in the acquired network speed distribution interval in the target region, with network speed proportions corresponding to respective network speeds in the network speed distribution of the target region and summing, to obtain the average freeze rate of the candidate video bit rate in the target region; and determining a sum of the average freeze rate of each candidate video bit rate in the candidate video bit rate combination in the target region as the average freeze rate of the candidate video bit rate combination in the target region.

In some alternative implementations, the average freeze duration of the candidate video bit rate combination in the target region may be obtained by:

for each candidate video bit rate in the candidate video bit rate combination, acquiring the network speed distribution interval of the candidate video bit rate in the target region, and weighting freeze durations of playing a video with the candidate video bit rate at different network speeds in the acquired network speed distribution interval in the target region, with network speed proportions corresponding to respective network speeds in the network speed distribution of the target region and summing, to obtain an average freeze duration of the candidate video bit rate in the target region; and determining a sum of the average freeze duration of each candidate video bit rate in the candidate video bit rate combination in the target region as the average freeze duration of the candidate video bit rate combination in the target region.

In some alternative implementations, the average video quality value of the candidate video bit rate combination in the target region may be obtained by:

for each candidate video bit rate in the candidate video bit rate combination, determining a video quality value corresponding to the candidate video bit rate according to a preset video quality determining logic; and weighting the video quality value corresponding to each candidate video bit rate in the candidate video bit rate combination, with a sum of network speed proportions of respective network speeds in the network speed distribution interval of the corresponding candidate video bit rate in the target region and summing, to obtain the average video quality value of the candidate video bit rate combination in the target region.

It should be noted that, for implementation details and technical effects of each unit in the video definition grade determining apparatus provided in the embodiments of the present disclosure, reference may be made to descriptions of other embodiments in the present disclosure, and details are not repeated here.

Figure 6:
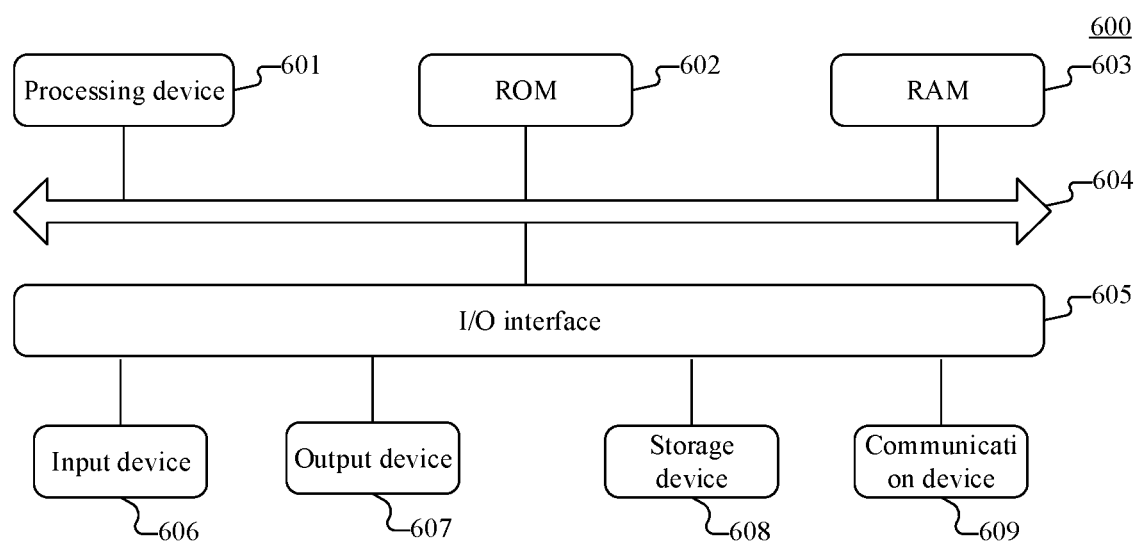
FIG. 6 is a schematic block diagram of a computer system of a video server suitable for implementing an embodiment of the present disclosure.

Referring now to FIG. 6, shown is a schematic block diagram of a computer system 600 of a video server suitable for implementing an embodiment of the present disclosure. The computer system 600 shown in FIG. 6 is only one example and should not impose any limitation on the functionality and use scope of the embodiment of the disclosure.

As shown in FIG. 6, the computer system 600 may comprise a processing device (e.g., central processor, graphics processor, etc.) 601 that may perform various appropriate actions and processes in accordance with a program stored in a Read Only Memory (ROM) 602 or a program loaded into a Random Access Memory (RAM) 603 from a storage device 608. In the RAM 603, various programs and data necessary for the operation of the video server 600 are also stored. The processing device 601, the ROM 602, and the RAM 603 are connected to each other via a bus 604. An input/output (I/O) interface 605 is also connected to the bus 604.

Generally, the following devices may be connected to the I/O interface 605: an input device 606 including, for example, a touch screen, touch pad, keyboard, mouse, camera, microphone, and the like; an output device 607 including, for example, a Liquid Crystal Display (LCD), a speaker, a vibrator, and the like; the storage device 608 including, for example, magnetic tape, hard disk, and the like.; and a communication device 609. The communication device 609 may allow the computer system 600 to communicate with other devices, wirelessly or by wires, to exchange data. While FIG. 6 illustrates the computer system 600 having various devices, it is to be understood that not all illustrated devices are required to be implemented or provided. More or fewer devices may be alternatively implemented or provided.

In particular, the processes described above with reference to the flow diagrams may be implemented as computer software programs, according to the embodiments of the present disclosure. The embodiments of the present disclosure also include a computer program product or computer program comprising instructions which, when executed by a processor, implement the steps of the video definition grade determining method according to the embodiments of the present disclosure. For example, the embodiments of the present disclosure include a computer program product comprising a computer program embodied on a computer-readable medium, the computer program comprising program code for performing the method illustrated by the flow diagram. In such an embodiment, the computer program may be downloaded and loaded from a network via the communication device 609, or loaded from the storage device 608, or loaded from the ROM 602. The computer program, when executed by the processing device 601, performs the above-described functions defined in the methods of the embodiments of the present disclosure.

It should be noted that the above computer-readable medium of the present disclosure may be a computer-readable signal medium or a computer-readable storage medium or any combination of both. The computer-readable storage medium may be, for example, but not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that can contain, or store a program for use by or in connection with an instruction execution system, apparatus, or device. In contrast, in the present disclosure, the computer-readable signal medium may include a data signal with computer-readable program code embodied therein, propagated in baseband or as part of a carrier wave. Such a propagated data signal may take any of a variety of forms, including, but not limited to, electromagnetic, optical, or any suitable combination thereof. The computer-readable signal medium may be any computer-readable medium other than the computer-readable storage medium and that can communicate, propagate, or transport a program for use by or in connection with an instruction execution system, apparatus, or device. Program code embodied on a computer readable medium may be transmitted using any appropriate medium, including but not limited to: electrical wires, optical cables, RF (radio frequency), etc., or any suitable combination of the foregoing.

The computer-readable medium may be embodied in the video server; or may exist separately and not be assembled into the video server.

The computer readable medium carries one or more programs which, when executed by the video server, cause the video server to implement the video definition grade determining method as shown in the embodiment shown in FIG. 2 and its alternative implementations.

Computer program code for carrying out operations of the present disclosure may be written in one or more programming languages or any combination thereof, the programming languages include an object oriented programming language such as Java, Smalltalk, C++, and conventional procedural programming languages, such as the "C" language or similar programming languages. The program code may be executed entirely on the user's computer, partly on the user's computer, as a stand-alone software package, partly on the user's computer and partly on a remote computer, or entirely on the remote computer or server. In a scenario in which a remote computer is involved, the remote computer may be connected to the user's computer through any type of network, including a Local Area Network (LAN) or a Wide Area Network (WAN), or be connected to an external computer (for example, through the Internet using an Internet service provider).

The flowchart and block diagrams in the drawings illustrate the architecture, functionality, and operation of possible implementations of the systems, methods and computer program products according to various embodiments of the present disclosure. In this regard, each block in the flowchart or block diagrams may represent a module, program segment, or portion of code, which comprises one or more executable instructions for implementing the specified logical function(s). It should also be noted that, in some alternative implementations, the functions noted in the block may occur in an order different from that noted in the drawings. For example, two blocks shown in succession may, in fact, be executed substantially concurrently, or the blocks may sometimes be executed in a reverse order, depending upon the functionality involved. It will also be noted that each block of the block diagrams and/or flowchart, and combinations of blocks in the block diagrams and/or flowchart, can be implemented by special purpose hardware-based systems that perform the specified functions or operations, or combinations of special purpose hardware and computer instructions.

The involved units described in the embodiments of the present disclosure may be implemented by software or hardware. Here, the name of a unit does not constitute a limitation on the unit itself in some cases, and for example, the definition-grade video obtaining unit may also be described as a "unit for obtaining a definition-grade video set for a target video corresponding to the target region".

The foregoing description is only explanations of the preferred embodiments of the present disclosure and the technical principles used. It will be appreciated by those skilled in the art that the scope of the disclosure involved in the present disclosure is not limited to a technical solution formed by a particular combination of the technical features described above, but also encompasses other technical solutions formed by any combination of the technical features described above or equivalents thereof without departing from the spirit of the disclosure, for example, technical solutions formed by replacing the above features and technical features having similar functions to those disclosed (but not limited to) in the present disclosure with each other.

What is claimed is:

1. A video definition grade determining method, comprising:
    in response to receiving a target video playing request transmitted by a client, determining a target region where the client is located and a current network speed of the client;
    determining, according to a video bit rate determining logic of the target region, a maximum video bit rate corresponding to the current network speed, wherein the video bit rate determining logic of the target region is used for determining a maximum video bit rate suitable for playing a video when a network speed of the target region is a respective network speed;
    obtaining a definition-grade video set for a target video corresponding to the target region; and
    according to the determined maximum video bit rate and a video bit rate of a definition-grade video in the obtained definition-grade video set, determining, in the obtained definition-grade video set, a definition-grade video to be played corresponding to the target video playing request.

2. The method according to claim 1, wherein, the method further comprises:
    sending the definition-grade video to be played to the client.

3. The method according to claim 1, wherein, the according to the determined maximum video bit rate and the video bit rate of the definition-grade video in the obtained definition-grade video set, determining, in the obtained definition-grade video set, the definition-grade video to be played corresponding to the target video playing request, comprises:
    determining a definition-grade video with a video bit rate less than or equal to the determined maximum video bit rate in the obtained definition-grade video set as a candidate definition-grade video; and
    determining a candidate definition-grade video with a largest video bit rate among all of the candidate definition-grade videos as the definition-grade video to be played.

4. The method according to claim 1, wherein, the obtaining the definition-grade video set for the target video corresponding to the target region comprises:
  obtaining the definition-grade video set for the target video corresponding to the target region from a definition-grade video library.

5. The method according to claim 4, wherein, a definition-grade video set corresponding to each video, corresponding to the target region, stored in the definition-grade video library, includes definition-grade videos with N different definition-grade video bit rates, where N is a positive integer.

6. The method according to claim 5, wherein, the N different definition-grade video bit rates are determined by:
  acquiring network speed distribution of the target region, wherein the network speed distribution comprises M preset network speeds and corresponding network speed distribution proportions, where M is a positive integer;
  searching preset N' candidate video bit rates for different candidate video bit rate combinations, and determining an optimal candidate video bit rate combination in the different candidate video bit rate combinations, wherein among all of the different candidate video bit rate combinations, a comprehensive user experience quality index of the optimal candidate video bit rate combination in the target region is optimal, and
  determining the optimal candidate video bit rate combination as the N different definition-grade video bit rates.

7. The method according to claim 6, wherein, a comprehensive user experience quality index of the candidate video bit rate combination in the target region is determined according to at least one user experience quality index of the candidate video bit rate combination in the target region, wherein the user experience quality index comprises: average freeze rate, average freeze duration, average consumption bandwidth and average video quality value, and wherein a comprehensive user experience quality is negatively correlated with the average freeze rate, the average freeze duration and the average consumption bandwidth, and is positively correlated with the average video quality value.

8. The method according to claim 7, wherein, the average consumption bandwidth of the candidate video bit rate combination in the target region is obtained by:
  according to a minimum network speed determining logic of the target region, for each candidate video bit rate in the candidate video bit rate combination, determining a minimum network speed of the candidate video bit rate in the target region, wherein the minimum network speed determining logic of the target region is used for characterizing a correspondence between a respective video bit rate and a minimum network speed required for playing a video with the respective video bit rate in the target region;
  determining a network speed distribution interval of each candidate video bit rate in the candidate video bit rate combination in the target region, according to the network speed distribution of the target region and the minimum network speed of each candidate video bit rate in the candidate video bit rate combination in the target region; and
  weighting each candidate video bit rate in the candidate video bit rate combination, with a sum of network speed proportions of respective network speeds in the network speed distribution interval of the candidate video bit rate in the target region and summing, to obtain the average consumption bandwidth of the candidate video bit rate combination in the target region.

9. The method according to claim 8, wherein, the average freeze rate of the candidate video bit rate combination in the target region is obtained by:
  for each candidate video bit rate in the candidate video bit rate combination, acquiring the network speed distribution interval of the candidate video bit rate in the target region, and weighting freeze rates of playing a video with the candidate video bit rate at different network speeds in the acquired network speed distribution interval in the target region, with network speed proportions corresponding to respective network speeds in the network speed distribution of the target region and summing, to obtain the average freeze rate of the candidate video bit rate in the target region; and
  determining a sum of the average freeze rate of each candidate video bit rate in the candidate video bit rate combination in the target region as the average freeze rate of the candidate video bit rate combination in the target region.

10. The method according to claim 8, wherein, the average freeze duration of the candidate video bit rate combination in the target region is obtained by:
  for each candidate video bit rate in the candidate video bit rate combination, acquiring the network speed distribution interval of the candidate video bit rate in the target region, and weighting freeze durations of playing a video with the candidate video bit rate at different network speeds in the acquired network speed distribution interval in the target region, with network speed proportions corresponding to respective network speeds in the network speed distribution of the target region and summing, to obtain an average freeze duration of the candidate video bit rate in the target region; and
  determining a sum of the average freeze duration of each candidate video bit rate in the candidate video bit rate combination in the target region as the average freeze duration of the candidate video bit rate combination in the target region.

11. The method according to claim 8, wherein, the average video quality value of the candidate video bit rate combination in the target region is obtained by:
  for each candidate video bit rate in the candidate video bit rate combination, determining a video quality value corresponding to the candidate video bit rate according to a preset video quality determining logic; and
  weighting the video quality value corresponding to each candidate video bit rate in the candidate video bit rate combination, with a sum of network speed proportions of respective network speeds in the network speed distribution interval of the corresponding candidate video bit rate in the target region and summing, to obtain the average video quality value of the candidate video bit rate combination in the target region.

12. A video server, comprising:
  one or more processors;
  a storage device, on which one or more programs are stored, wherein the one or more programs, when executed by the one or more processors, cause the one or more processors to perform the step of:
  in response to receiving a target video playing request transmitted by a client, determining a target region where the client is located and a current network speed of the client;

determining, according to a video bit rate determining logic of the target region, a maximum video bit rate corresponding to the current network speed, wherein the video bit rate determining logic of the target region is used for determining a maximum video bit rate suitable for playing a video when a network speed of the target region is a respective network speed;

obtaining a definition-grade video set for a target video corresponding to the target region; and according to the determined maximum video bit rate and a video bit rate of a definition-grade video in the obtained definition-grade video set, determining, in the obtained definition-grade video set, a definition-grade video to be played corresponding to the target video playing request.

13. A non-transitory computer-readable storage medium on which a computer program is stored, wherein the computer program, when executed by one or more processors, cause the one or more processors to perform the step of:

in response to receiving a target video playing request transmitted by a client, determining a target region where the client is located and a current network speed of the client;

determining, according to a video bit rate determining logic of the target region, a maximum video bit rate corresponding to the current network speed, wherein the video bit rate determining logic of the target region is used for determining a maximum video bit rate suitable for playing a video when a network speed of the target region is a respective network speed;

obtaining a definition-grade video set for a target video corresponding to the target region; and according to the determined maximum video bit rate and a video bit rate of a definition-grade video in the obtained definition-grade video set, determining, in the obtained definition-grade video set, a definition-grade video to be played corresponding to the target video playing request.

14. A computer program comprising:

instructions which, when executed by a processor, cause the processor to implement the method according to claim 1.

\* \* \* \* \*